United States Patent [19]

Speranza

[11] Patent Number: 4,714,144
[45] Date of Patent: Dec. 22, 1987

[54] METHOD FOR CONTROLLING AMT SYSTEM START FROM STOP OPERATION

[75] Inventor: Donald Speranza, Canton, Mich.

[73] Assignee: Eaton Corporation, Cleveland, Ohio

[21] Appl. No.: 853,483

[22] Filed: Apr. 18, 1986

[51] Int. Cl.$^4$ ............................................. B60K 41/02
[52] U.S. Cl. ............................. 192/0.084; 192/0.096; 364/424.1; 123/352
[58] Field of Search ............... 192/0.046, 0.058, 0.062, 192/0.08, 0.084, 0.092, 0.096; 364/424.1; 123/352, 478

[56] References Cited

U.S. PATENT DOCUMENTS

| | | | |
|---|---|---|---|
| 3,645,366 | 2/1972 | Numazawa et al. | 192/0.08 |
| 3,667,577 | 6/1972 | Weymann | 192/0.08 |
| 4,036,340 | 7/1977 | Hufendick | 192/0.084 |
| 4,081,065 | 3/1978 | Smyth et al. | 192/0.076 |
| 4,090,480 | 5/1978 | Kasiewicz | 123/352 X |
| 4,194,608 | 3/1980 | Usui et al. | 192/0.084 X |
| 4,291,594 | 9/1981 | Baudoin | 192/0.058 X |
| 4,361,060 | 11/1982 | Smyth | 74/866 |
| 4,432,445 | 2/1984 | Windsor | 192/0.076 |
| 4,474,155 | 10/1984 | Sagues | 123/352 |
| 4,493,228 | 1/1985 | Vukovich et al. | 74/858 |
| 4,506,770 | 3/1985 | Schmid | 192/0.08 |
| 4,520,778 | 6/1985 | Narjo et al. | 123/352 |
| 4,551,802 | 11/1985 | Smyth | 364/424.1 |
| 4,558,772 | 12/1985 | Grimes et al. | 192/0.076 |
| 4,603,668 | 8/1986 | Veno | 123/352 |
| 4,618,043 | 10/1986 | Hattori et al. | 192/0.092 X |

FOREIGN PATENT DOCUMENTS 2066919  7/1981  United Kingdom ............. 192/0.084

Primary Examiner—Rodney H. Bonck
Assistant Examiner—Richard M. Lorence
Attorney, Agent, or Firm—D. A. Rowe; H. D. Gordon

[57] ABSTRACT

A method for controlling an AMT system (10) is provided including sensing vehicle start from stop operation and providing closed loop control of both the clutch operator (30) and the fuel control (26) during such operation. A function (E) of the difference between actual (N) and desired (A) engine speed is calculated and compared to a reference (REF), and if greater than the reference, fuel supply to the engine (14) is not permitted to increase.

7 Claims, 3 Drawing Figures

METHOD FOR CONTROLLING AMT SYSTEM START FROM STOP OPERATION

BACKGROUND OF THE INVENTION

1. Field of the Invention

This invention relates to automatic power transmissions providing a plurality of gear reduction ratios, such as automatic mechanical transmissions (i.e. "AMTs"), and, to control systems and methods therefor. In particular, the present invention relates to control systems and methods for automatic mechanical transmission systems wherein gear selection and shift decisions are made and/or executed based upon measured and/or calculated parameters such as vehicle or transmission output shaft speed, transmission input shaft speed, engine speed, throttle position, rate of change of throttle position, rate of change of vehicle and/or engine speed and the like. More particularly, the present invention relates to a method for controlling an AMT system during a vehicle start from stop operation including controlling both the master clutch and the fuel supply to the engine.

2. Description of the Prior Art

The use of automatic transmissions of both the automatic mechanical type utilizing positive clutches and of the planetary gear type utilizing frictional clutches is well known in the prior art as are control systems therefor. Electronic control systems utilizing discrete logic circuits and/or software controlled microprocessors for automatic transmissions wherein gear selection and shift decisions are made based upon certain measured and/or calculated parameters such as vehicle speed (or transmission output shaft speed), transmission input shaft speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are known in the prior art. Examples of such automatic/semiautomatic transmission control systems for vehicles may be seen by reference to U.S. Pat. Nos. 4,361,060; 4,551,802; 4,527,447; 4,425,620; 4,463,427; 4,081,065; 4,073,203; 4,253,348; 4,038,889; 4,226,295; 3,776,048, 4,208,929; 4,039,061; 3,974,720; 3,478,851 and 3,942,393, the disclosures of which are all hereby incorporated by reference.

Automatic control systems/subsystems for automatically controlling the engagement and disengagement of AMT system vehicle master clutches, especially during vehicle start from stop operations, are known in the prior art as may be seen by reference to U.S. Pat. Nos. 4,081,065; 4,401,200; 4,413,714; 4,432,445, 4,509,625 and 4,576,263, the disclosures of all of which are hereby incorporated by reference.

While the above referenced automatic/semiautomatic transmission control systems, especially the system illustrated in U.S. Pat. Nos. 4,081,065 and 4,576,263 and similar systems, are effective to control the vehicle master clutch during start from stop operations under most conditions, under certain conditions, if fuel is allowed to supplied in accordance with throttle pedal setting, the clutch may not engage in a manner sufficiently rapid to control the engine (i.e. prevent the engine from undesirably racing at a higher than desired rotational speed) and/or may not provide an acceptably smooth engagement of the clutch.

SUMMARY OF THE INVENTION

In accordance with the present invention, the drawbacks of the prior art have been overcome or minimized by providing a control system, preferably an electronic control system, and control method, for automatic/semiautomatic mechanical transmission systems wherein clutch engagement, throttle setting, gear selection and shift decisions are made and/or executed based upon measured and/or calculated parameters including at least input signals indicative of engine speed and throttle position. Other inputs/parameters, such as signals indicative of transmission input shaft speed, transmission output shaft speed, rate of change of throttle position, condition of the master clutch, currently engaged gear ratio, operation of the vehicle brakes, and the like are also utilized to make decisions for control of the AMT system.

The predetermined logic rules or programs by which the various input signals are processed include a method for detecting a start from stop operation, for calculating an error value (E) which is a function of engine speed and throttle position, for manipulating the clutch to minimize the value of the error value (E) and, if the magnitude of the error value (E) exceeds a predetermined reference value, preventing further increase in the supply of fuel to the engine while the magnitude of the error value (E) exceeds the reference.

Preferably, as disclosed in above-mentioned U.S. Pat. No. 4,081,065, the control method will act to minimize the error value (E) where (E) is represented by the equation:

$$E = N - A + K(dN/dt)$$

where
  N = the engine speed
  dN/dt = the acceleration of the engine
  A = the throttle position
  K = a weighting factor
  E = error If the error (E) is positive, the actuator operates to engage the clutch. If the error value (E) is negative, the actuator operates to disengage the clutch.

This control equation is operative only when the clutch is to be engaged. To disengage the clutch, either additional control signals such as may be supplied by a switch are used; or the value of A is made small or zero by other means.

Accordingly, it is an object of the present invention to provide a new and improved control method for automatic mechanical transmission systems which involves sensing and identifying a start from stop vehicle operation, calculating an error value to be minimized by clutch manipulation and, if the magnitude of the error value exceeds a predetermined value, preventing increased supply of fuel to the engine.

DESCRIPTION OF THE PREFERRED EMBODIMENT

Figure 1:
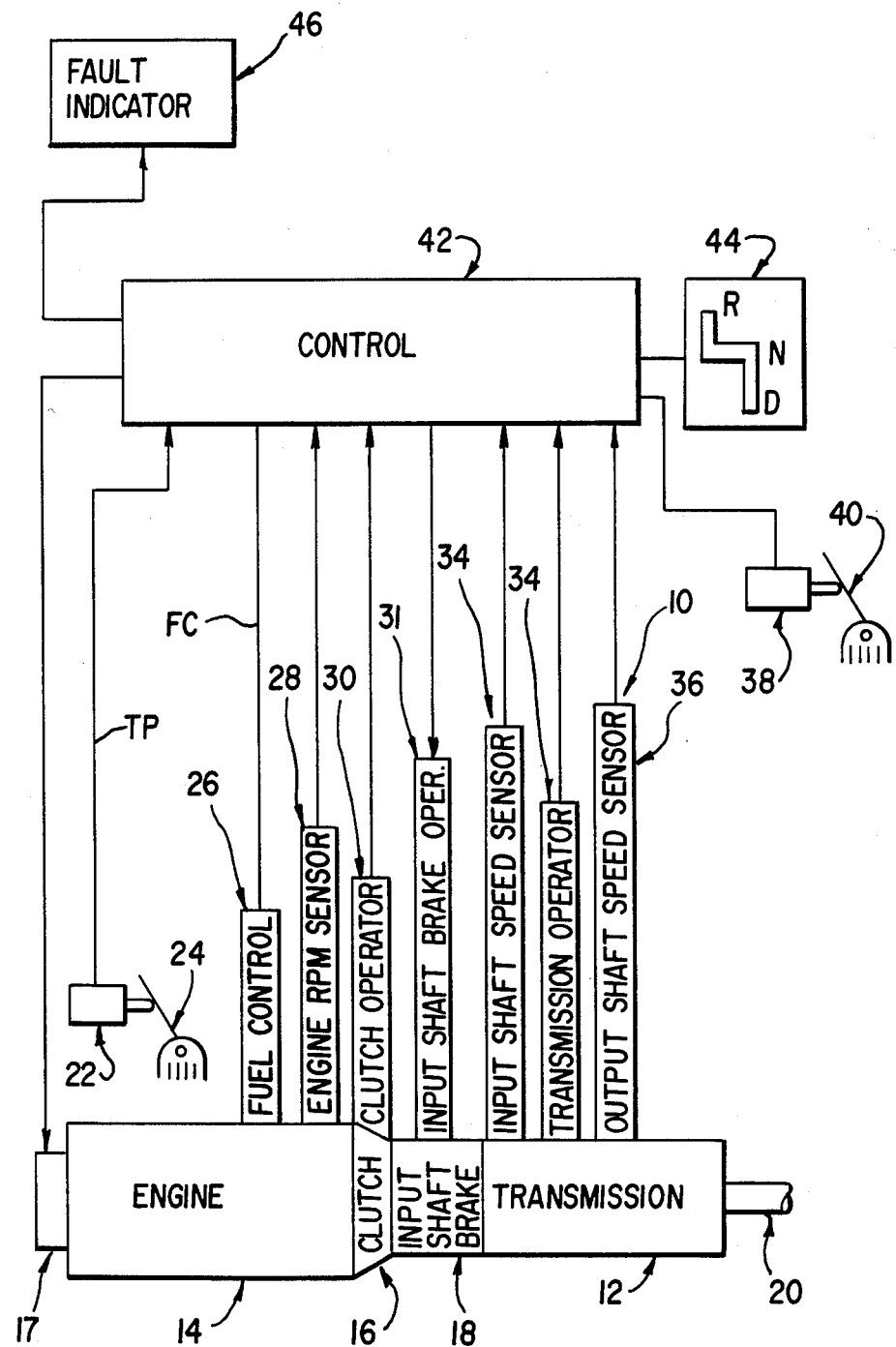
FIG. 1 is a schematic illustration of the components and interconnections of the automatic mechanical transmission control system of the present invention.

FIG. 1 schematically illustrates an automatic mechanical transmission system 10 including an automatic multi-speed compound change gear transmission 12 driven by a throttle controlled engine 14, such as a well known diesel engine, through a master clutch 16. An engine brake, such as an exhaust brake 17 for retarding the rotational speed of engine 14 and/or an input shaft brake 18 which is effective to apply a retarding force to the input shaft upon disengagement of master clutch 16 may be provided as is known in the prior art. The output of automatic transmission 12 is output shaft 20 which is adopted for driving connection to an appropriate vehicle component such as the differential of a drive axle, a transfer case or the like as is well known in the prior art.

The above mentioned power train components are acted upon and monitored by several devices, each of which will be discussed in greater detail below. These devices include a throttle position or throttle opening monitor assembly 22 which senses the position of the operator controlled vehicle throttle or other fuel throttling device 24, a fuel control device 26 for controlling the amount of fuel to be supplied to engine 14, an engine speed sensor 28 which senses the rotational speed of the engine, a clutch operator 30 which engages and disengages clutch 16 and which also supplies information as to the status of the clutch, an input brake operator 31, a transmission input shaft speed sensor 32, a transmission operator 34 which is effective to shift the transmission 12 into a selected gear ratio and to provide a signal indicative of currently engaged ratio, and a transmission output shaft speed sensor 36. A vehicle brake monitor 38 senses actuation of vehicle brake pedal 40.

The above mentioned devices supply information to and/or accept commands from a central processing unit or control 42. The central processing unit 42 may include analogue and/or digital electronic calculation and logic circuitry, the specific configuration and structure of which forms no part of the present invention. The central processing unit 42 also receives information from a shift control assembly 44 by which the vehicle operator may select a reverse (R), neutral (N), or forward drive (D) mode of operation of the vehicle. An electrical power source (not shown) and/or source of pressurized fluid (not shown) provides electrical and/or pneumatic power to the various sensing, operating and/or processing units. A fault indicator or alarm 46 may display the identity of a specific fault or simply signal the existence of an unidentified fault. Drive train components and controls therefor of the type described above are known in the prior art and may be appreciated in greater detail by reference to above mentioned U.S. Pat. Nos. 4,361,060; 3,776,048; 4,038,889 and 4,226,295.

Sensors 22, 28, 32, 36, 38 and 44 may be of any known type or construction for generating analogue or digital signals proportional to the parameter monitored thereby. Similarly, operators 17, 18, 26, 30 and 34 may be of any known electrical, pneumatic or electropneumatic type for executing operations in response to command signals from processing unit 42. Fuel control 26 will normally supply fuel to engine 14 in accordance with the operator's setting of throttle 24 but may supply a lesser (fuel dip) or greater (fuel boost) amount of fuel in accordance with commands from control unit 42. If the setting of the fuel control 26 differs from the setting of throttle 24, the fuel control will be ramped up or down, as appropriate, to match the throttle setting. One control system for adjusting fuel control in view of throttle setting is, by way of example only, illustrated in U.S. Pat. No. 4,493,228, the disclosure of which is hereby incorporated by reference.

The purpose of the central processing unit 42 is to select, in accordance with a program (i.e. predetermined logic rules) and current or stored parameters, the optimal gear ratio at which the transmission should be operating and, if necessary, to command a gear change, or shift, into the selected optimal gear ratio based upon the current and/or stored information.

The various functions to be performed by central processing unit 42, and a preferred manner of performing same may be seen in greater detail by reference to U.S. patent application Ser. No. 659,114 filed Oct. 10, 1984, now U.S. Pat. No. 4,595,986, and to published Society of Automotive Engineers SAE Paper No. 831776 published November 1983, the disclosures of which are hereby incorporated by reference.

Referring to the vehicle start from stop mode of operation of AMT system 10, fuel control 26 and clutch operator 30 are controlled as follows.

When the vehicle operator wishes to start, he will release the brake 40 and depress throttle pedal 24. The control, or central processing unit 42, which is preferably microprocess based, will calculate an error value to be minimized.

$$E = N - A + K(dN/dt),$$

where
 N = the engine speed
 A = the throttle position signal adjusted to provide desired engagement characteristics, e.g. at full throttle this signal could equal the speed signal N at peak torque speed of the engine and at the closed throttle position it could equal the idle speed value of N,
 K = a constant representing an appropriate weighting factor for the inertial effect of a change in engine speed on the torque output of the engine,
 dN/dt = the acceleration of the engine.

Thus, in the initial stage, the driver presses the accelerator to a position, which will depend upon whether he needs to make a gentle start or a severe start and, as the clutch starts to engage, the engine may accelerate to a speed above the corresponding value of the throttle adjustment and the value of N−A becomes positive. Since the engine is accelerating, the overall value of the relationship N−A+K dN/dt is positive and the actuator 12 receives a signal causing the clutch to continue to engage. When the torque loading of the engaged clutch starts to decelerate the engine to the point where the above expression equals zero, then there will be no further engagement of the clutch elements since error signal E has become substantially zero. Once the vehicle accelerates to a speed equal to the throttle adjustment speed, the engine will start to speed above the set throttle speed and the relationship N−A+K dN/dt becomes positive again, providing a signal to the actuator 30 driving that actuator toward fuller engagement of the clutch elements. However, since the vehicle is now traveling at the speed corresponding to engine speed and the current effective ratio of the vehicle drive train with no slip of clutch 16, further engagement of the clutch does not provide additional torque loading and the actuator continues to drive the clutch elements, until they are completely engaged.

While the above is occurring, the input signal from the throttle pedal position sensor 22 sends an input signal, TP, indicative of throttle pedal 24 position to the control unit 42. The control unit will compare the input signal TP to the command output signal, FC, to the fuel control 26 and, under ordinary conditions, if necessary, increase or decrease the magnitude of FC so that fuel control 26 supplies fuel to engine 14 in accordance with the operator's demands.

If, however, the magnitude of the error signal E exceeds a predetermined reference value, REF, this is indicative of a condition wherein the engine speed N and/or engine acceleration have reached such a high value relative to the operators setting of the throttle and/or the predetermined desirable start from stop engine speeds at that throttle setting, A, that acceptable control of the system without engine racing (i.e. flaring up to unacceptably high rotational speeds) and/or unacceptably harsh clutch engagement requires that the supply of fuel to the engine 14 not be increased, even if TP is greater than FC. Alternatively, the supply of fuel to engine 14 may actually be slightly decreased regardless of TP being equal to or greater than FC.

At such time that the magnitude of error signal E is less than the reference REF, its is assumed that the clutch 16 can control the engine 14 and the supply of fuel to engine 14 is allowed to increase until FC is equal to TP.

Figure 2A:
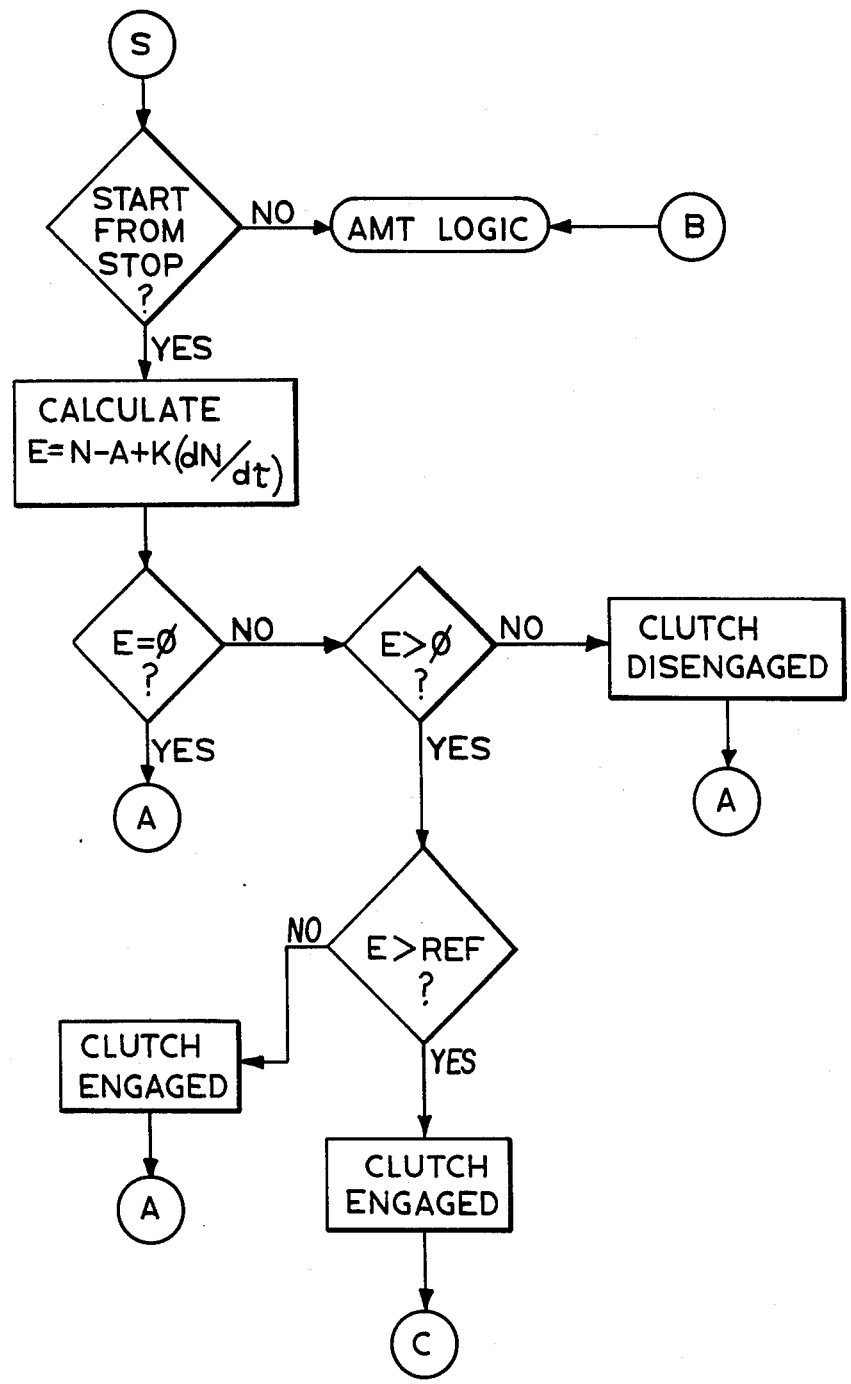
FIGS. 2A–2B are symbolic illustrations, in the form of a flow chart, illustrating the preferred manner of practicing the method of the present invention.
Figure 2B:
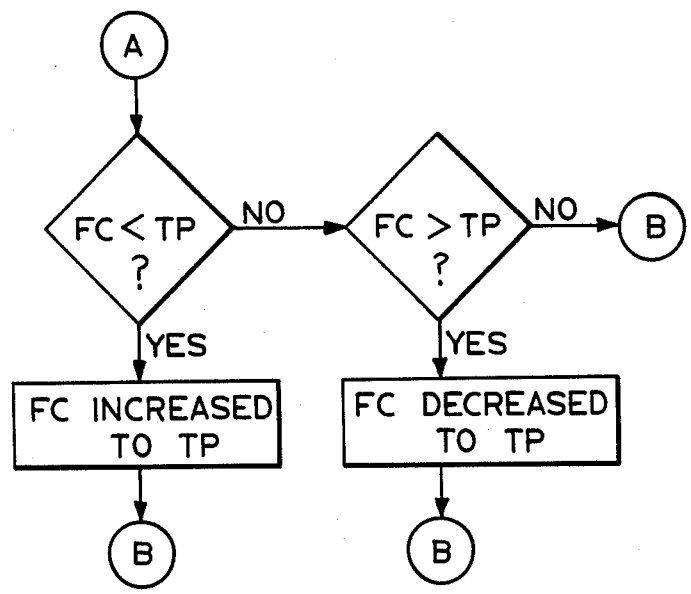
Figure 2B:
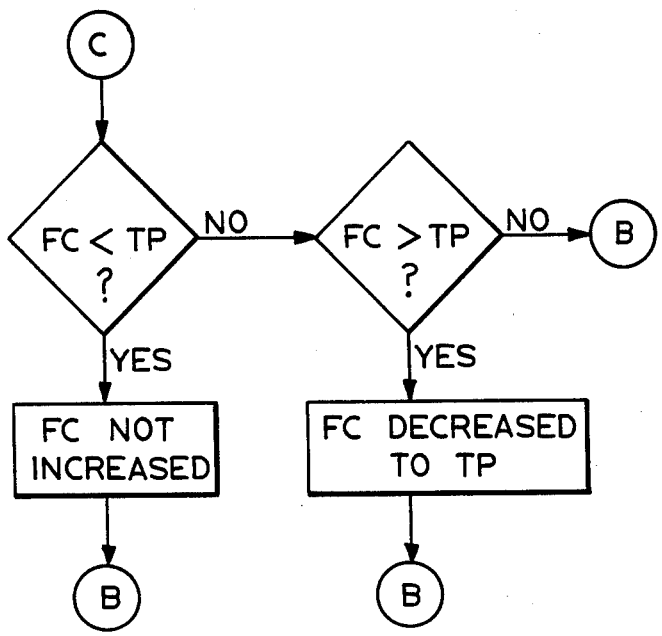

The method of the present invention is symbolically illustrated, in the form of flow charts, in FIGS. 2A and 2B.

Although the AMT system 10 has been described as utilizing a microprocessor based control 42 and the methods and operations carried out as software modes or algorithms, it is clear that the operations can also be carried out in electronic/fluidic logic circuits comprising discrete hardware components.

Clutch operator 30 is preferably controlled by the central processing unit 42 and engages and disengages master clutch 16 generally as described in above-mentioned U.S. Pat. No. 4,081,065. Transmission 12 may include synchronizing means, such as an accelerator and/or a brake mechanism as described in U.S. Pat. No. 3,478,851, hereby incorporated by reference. The transmission 12 is preferably, but not necessarily, of the twin countershaft type as is seen in U.S. Pat. No. 3,105,395, hereby incorporated by reference.

Although the present invention has been set forth with a certain degree of particularity, it is understood the various modifications are possible without departing from the spirit and scope of the invention as hereinafter claimed.

I claim:

1. A method for controlling a vehicle automatic mechanical transmission system for vehicles having an operator actuated throttle pedal, a throttle-controlled engine, a transmission having a plurality of gear ratio combinations selectively engageable between a transmission input shaft and a transmission output shaft, said transmission input shaft being operatively connected to said engine by means of a selectably engageable and disengageable friction coupling, said automatic mechanical transmission system comprising an information processing unit having means for receiving a plurality of input signals including (1) an input signal indicative of the rotational speed of the engine; and (2) an input signal indicative of the operator's setting of the throttle pedal, said processing unit including means for processing said input signals in accordance with a program for generating output signals whereby said transmission system is operated in accordance with said program, and means associated with said transmission system effective to actuate said transmission system to effect engagement of said gear ratio combinations in response to said output signals from said processing unit, said processing unit having means to sense vehicle start from stop operation and, in a vehicle start from stop operation, issuing output signals to control means for controlling the amount of engagement of said friction coupling, said control means having a first state in which said friction coupling is completely disengaged, a second state in which said friction coupling is completely engaged and a third state occurring during the transition from said first state to said second state, when said friction coupling engageable elements are partially engaged, said control means being operative during said third state to engage said coupling elements sufficiently to maintain the speed of rotation of said engine at a value in predetermined relation to the adjustment position of said throttle whereby a function E is minimized where:

E is a function of N−A where:
N is a value indicative of engine speed,
A is a value indicative of a predetermined desired engine speed at current throttle position;

the method characterized by:
calculating the value of E;
comparing the value of E to a predetermined reference value; and
preventing increased supply of fuel to the engine, regardless of the throttle pedal setting, if E is equal to or greater than said reference value.

2. The method of claim 1 wherein said reference value corresponds to the value of E at the condition wherein increased engagement of said coupling cannot prevent the value of N from exceeding a predetermined maximum value.

3. The method of claim 1 wherein the supply of fuel to the engine is decreased if E is equal to or greater than said reference value.

4. The method of claim 2 wherein the supply of fuel to the engine is decreased if E is equal to or greater than said reference value.

5. The method of claim 1 wherein:

$$E = N - A + K(dN/dt)$$

where:
dN/dt is the acceleration of said engine, and K is a weighting factor.

6. The method of claim 2 wherein:

$$E = N - A + K(dN/dt)$$

where:
dN/dt is the acceleration of said engine, and K is a weighting factor.

7. The method of claim 3 wherein:

$$E = N - A + K(dN/dt)$$

where:
dN/dt is the acceleration of said engine, and K is a weighting factor.

* * * * *